United States Patent

[11] 3,624,291

[72] Inventor Shoichi Miyata
Tokyo, Japan

[21] Appl. No. 888,283
[22] Filed Dec. 29, 1969
[45] Patented Nov. 30, 1971
[73] Assignee Olympus Optical Company Limited
Tokyo, Japan
[32] Priorities Dec. 28, 1968
[33] Japan
[31] 43/96293;
May 14, 1969, Japan, No. 44/36708

[54] OPTICALLY INTERLACED SCANNING AND REPRODUCING APPARATUS USING MULTIPLE DRUMS TO PERMIT SCANNING OF MOTION PICTURE FILM OR STATIONARY FILM
7 Claims, 21 Drawing Figs.

[52] U.S. Cl. 178/7.6, 178/DIG. 27, 178/DIG. 28
[51] Int. Cl. H04n 3/04
[50] Field of Search 178/7.6, DIG. 28, DIG. 27; 250/230; 350/7, 99, 266, 273, 285

[56] References Cited
UNITED STATES PATENTS

| | | | |
|---|---|---|---|
| 1,859,597 | 5/1932 | Nason | 178/7.6 |
| 2,113,411 | 4/1938 | Schiller | 178/7.6 |
| 2,152,234 | 3/1939 | Ballard | 178/7.6 |
| 2,225,097 | 12/1940 | Cawley | 178/7.6 |
| 3,277,772 | 10/1966 | Atwood | 178/7.6 |
| 3,263,027 | 7/1966 | Beltrami | 178/6 BWR |

*Primary Examiner*—Robert L. Griffin
*Assistant Examiner*—Donald E. Stout
*Attorney*—Waters, Roditi, Schwartz & Nissen

ABSTRACT: This apparatus uses one or more drums each having a number of small holes or convex lenses for converting a light ray emitted from a light source into light spots each having a small diameter. The light spots are projected onto a scanning raster region through which moves a picture film. A light passed through the film is converted into an electrical signal adapted to be supplied to a conventional television receiver.

OPTICALLY INTERLACED SCANNING AND REPRODUCING APPARATUS USING MULTIPLE DRUMS TO PERMIT SCANNING OF MOTION PICTURE FILM OR STATIONARY FILM

This invention relates to an optically interlaced scanning and reproducing apparatus and more particularly an apparatus for effecting optically interlaced scanning of a film picture photographed by a cinecamera, etc. to produce a television signal by means of a photoelectric converter means, said television signal being supplied to a conventional television receiver which serves to reproduce said television signal on a display screen as a television picture.

As a method of effecting optically interlaced scanning of a cinefilm to obtain a television signal, a flying spot scanning with the aide of a cathode-ray tube, etc. has heretofore been widely adopted. Such means, however, requires an apparatus of a large scale and hence becomes expensive, with the result that such means is not suitable as an interlaced scanning device of a small scale for domestic and educational uses. A method of using optical fibers has also been proposed. Such method also makes use of a device which is considerably complex in construction and hence expensive.

An object of the invention is to provide an interlaced scanning and reproducing apparatus which is very simple in construction if compared with the conventional interlaced scanning and reproducing apparatus and which can effect an interlaced scanning of a film to produce a television signal in a less expensive manner.

A feature of the invention is the provision of such an improved optically interlaced scanning and reproducing apparatus comprising a film, a light source, a drum rotating at a given speed and having on its periphery means for converting a light ray emitted from said light source into light spots each having a small diameter, an optical system for projecting said light spots onto a scanning raster region, means for moving the film through said scanning raster region at a given speed, and means for receiving a light passing through the film in the scanning raster region and converting it into an electrical signal.

An embodiment of the scanning apparatus according to the invention incorporates a rotary drum rotating at a speed equal to a frame frequency of a television signal and provided at its periphery with a number of small holes whose diameter corresponds to the dimension of a picture element and whose number corresponds to the number of scanning lines, said small holes being arranged along a spiral line having a pitch corresponding to a height of a scanning raster region in vertical direction and separated one from the other by a distance corresponding to a width of the scanning raster region in horizontal direction so as to cause said small holes to be projected onto a film by means of an optical system and hence produce a flying spot, said film being moved at a constant speed corresponding to the frame frequency thus effecting an interlaced scanning.

In order to bring the scanning apparatus according to the invention into agreement with the Japanese television standard (525 lines per frame, 30 frames per second), it is necessary to satisfy the following conditions that the pitch D' of the spiral line is made $D/m$ where D is the height of a scanning raster region to be scanned by a light spot having a diameter $d$ corresponding to a picture element of a television picture and $m$ is a magnification of the optical system for projecting the light spot onto the scanning raster region, that a distance H' between adjacent small holes is made $H/m$ where H is the width of the scanning raster region, that the diameter $d'$ of the small hole is made $d/m$, that the number of the small holes is made (525+1)=526, that the rotating speed of the rotary drum is made 30 revolutions per second, and that the travelling speed of the film is made 30 frames per second. The number of the small holes is not always necessary to be 526. It may sometimes be 525. In practice, it may, of course, be much smaller number.

The scanning apparatus according to the invention causes the film to move at a speed corresponding to the frame frequency of the television signal, for example, at a speed of 30 frames per second and hence cannot utilize the conventional film to be moved at a speed of 24 frames per second. A special film adapted to be moved at a speed of 30 frames per second may be stocked, for example, in a film library and any one who wishes to utilize such special film can easily take it out of the film library.

In the above embodiment of the scanning apparatus according to the invention the rotary drum is provided at its periphery with a number of small scanning holes. Also in Nipkow's disc a number of small scanning holes is formed at a part near the periphery. However, in practice, it is mechanically very difficult to form extremely small holes each having a given diameter and shape and separated by a given distance one from the other. Moreover, since such holes are extremely small in diameter, the intensity of light ray passing therethrough becomes weak and there involves a risk of insufficient scanning. This problem can be resolved to a certain degree by increasing the intensity of light ray emitted from the light source. Such means, at any rate has the disadvantage that the light loss becomes increased.

Therefore further object of the invention is to provide a scanning and reproducing apparatus which is capable of obviating the above mentioned disadvantage and can be manufacture in an extremely simple and less expensive manner.

Another feature of the invention is the provision of such an improved scanning and reproducing apparatus which incorporates a rotary drum provided at its periphery with a number of aligned convex lenses arranged to be irradiated through a collimator lens with light ray emitted from the light source, a circular diaphragm arranged in the light path between said light source and the collimator lens to produce an image of the circular diaphragm by means of said collimator lens and convex lens, and a projecting lens for projecting said image onto a scanning region.

Other objects, features and advantages of the invention will become apparent from a consideration from the following specification, when the specification is considered in conjunction with the accompanying drawings, which illustrates in:

Figure 1:
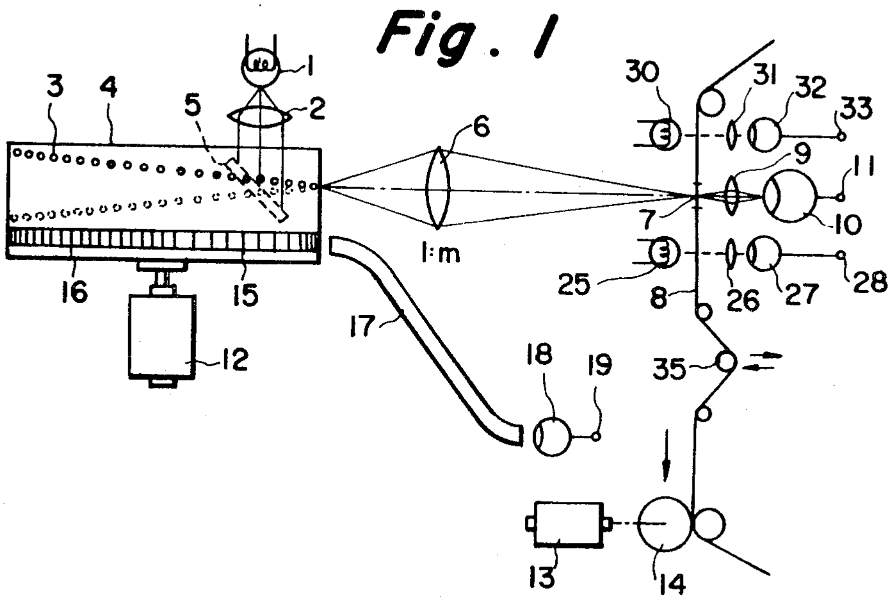
FIG. 1 shows diagrammatically a construction and arrangement of an embodiment of a scanning and reproducing apparatus according to the invention.
Figure 2:
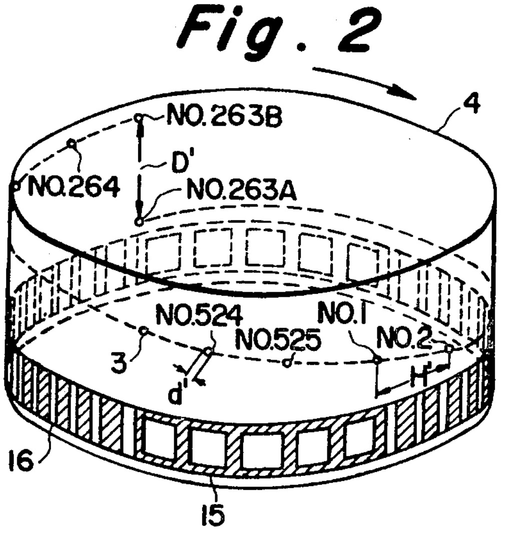
FIG. 2 is a perspective view of a rotary drum showing its construction in detail.
Figures 4A, 4B, 4C:
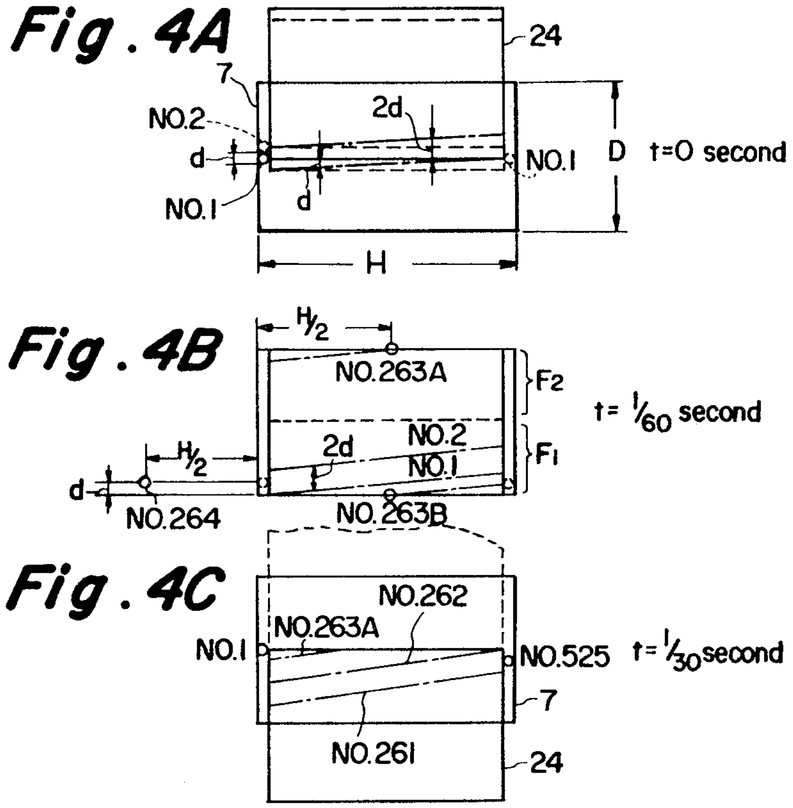
FIGS. 4A, 4B and 4C show diagrams illustrating the scanning operation for scanning a moving film picture of the scanning and reproducing apparatus according to the invention.

Referring to the drawing, an embodiment of a scanning apparatus according to the invention shown in FIG. 1 comprises a light source 1. The light ray radiated from the light source 1 is rendered parallel by a collimator lens 2. The parallel light ray is incident upon a reflecting mirror 5 arranged in a rotary drum 4. The rotary drum 4 is provided at its periphery with small scanning holes 3. In this embodiment the number of these small holes 3 is equal to the number *n* of scanning lines of one frame of the television picture plus 1, that is, $n=1$. These small scanning holes 3 are arranged along a spiral line and spaced by a distance H' (FIG 2) corresponding to the width H of a scanning raster region 7 (FIG. 4A). The light ray arriving at the reflecting mirror 5 changes its direction by 90° and then is projected into the small scanning holes 3. The pitch D' of said spiral line (FIG. 2) corresponds to the height D of the scanning raster region 7 (FIG. 4A). The light source 1 and collimator lens 2 may be arranged in the space within the drum 4. In such a case the reflecting mirror 5 may be omitted. The light ray passed through the small hole 3 is projected through a projecting lens 6 upon the scanning raster region 7. The projecting lens 6 serves to invert the image so that if the drum 4 is rotated in a clockwise direction viewed from the light source 1 the light spot formed by the light ray passed through the small hole 3 moves upwards in succession in the scanning raster region 7. A film 8 is fed downwards through the scanning raster region 7 at a speed of 30D per second. Thus, according to the invention is required to make the moving direction of the scanning spot opposite to the travelling direction of the film 8. The light ray passed through the film 8 is condensed by a lens 9 and incident upon a photoelectric converting device 10 whose output terminal 11 generates a video signal. A motor 12 causes the rotary drum 4 to rotate at a rotating speed equal to the frame frequency of the television signal. A motor 13 and capstan 14 cause the film 8 to travel at a constant speed corresponding to the frame frequency of the television signal. The rotary drum 4 is provided at its periphery with a vertical flyback mark 15 for producing a vertical blanking signal and a horizontal flyback mark 16 for producing a horizontal blanking signal (FIG. 2). These marks 15 and 16 are scanned by the light ray from the light source 1 or any other suitable light source. The light ray having passed through these marks 15 and 16 is incident through, for example, a light guide 17 upon a photoelectric converting device 18 whose output terminal 19 generates the vertical and horizontal blanking signals.

FIG. 2 shows the construction of the rotary drum 4 in detail. The rotary drum 4 is provided at its periphery with the small scanning holes 3 arranged along a spiral line and spaced one from the other. In this embodiment the number of the small scanning holes 3 is equal to the number of scanning lines plus 1. In FIG. 2 the small scanning holes 3 are designated by corresponding scanning numbers. A small hole No. 1 corresponding to the first scanning line is formed at the center of the spiral line. Two small holes corresponding to the 263rd scanning line are formed such that the first small hole No. 263A is formed at the lower end of the spiral line and the second small hole No. 263B is formed at the upper end of the spiral line. Since in the interlaced scanning, one field is scanned by 262½ scanning lines, it is theoretically necessary to provide two small holes Nos. 263A and 263B for the 263rd scanning line.

Figure 3:
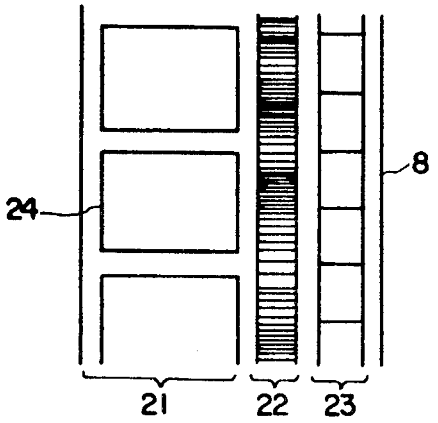
FIG. 3 is a plan view of a film picture adapted to be scanned by the scanning and reproducing apparatus according to the invention.

As shown in FIG. 3, on the film 8, there are formed three parallel tracks, i.e. a track 21 having a record of images, a track 22 having a record of audio signals and a track 23 having a record of signals for synchronously controlling the motor 12 for driving the drum 4. In the image track 21 images are recorded at the rate of 30 frames per second which corresponds to the frame frequency of the television signal. This image track 21 is scanned at the scanning raster region 7 by means of the light spots formed by light emitted from the light source 1 and passing through the scanning small holes 3. Audio signal may be recorded either optically or magnetically in the conventional manner. In this embodiment the audio signal is recorded optically on the track 22. The audio signal track 22 is scanned by a light source 25, a lens 26 and a photoelectric converting device 27 so as to produce the audio signal at an output terminal 28 of the photoelectric converting device 27. The track 23 for controlling the rotation of the drum 4 is scanned by a light source 30, a lens 31 and a photoelectric converting device 32 which supplies a control signal for the drum 4 at its output terminal 33. By means of thus obtained control signals it is possible to control the motor 12, for example, the synchronous motor so as to obtain the synchronization of the rotation of the drum 4 with the travelling of the film 8. In order to match the phase of the scanning raster region 7 with that of a frame 24 of the film 8 a pulley 35 is provided before the capstan 14 and after the scanning raster region 7.

FIG. 4A shows the relative relation at an instant $t=0$ of the scanning raster region 7, the position of the frame 24 of the film 8 and the position of light spots formed on the film 8 by light passing through the scanning small holes 3 of the rotary drum 4. These light spots are designated by the corresponding scanning line numbers. It should be noted that the film 8 moves downward and the light spot of the scanning small hole 3 moves upward. At this instant the lower end of the frame 24 of the film 8 is at the center of the scanning raster region 7 and therefrom a scanning begins by the light spot No. 1 associated with the first scanning line. As the drum 4 rotates over the distance H' measured on its periphery, which corresponds to the distance between successive small holes 3, the light spot No. 1 scans the frame 24 from the left-hand end to the right-hand end over the width H of the scanning raster region 7, while the light spot No. 1 moves upward by its diameter *d* and the film 8 moves downward by the same distance *d*. The position of the light spot No. 1 at that time is indicated by dotted lines and its scanning trace is shown by dot and dash lines. Thus, at this time the light spot No. 2 which corresponds to the second scanning line and which is shown by dotted lines is to begin to scan at a point which is apart from the first light spot No. 1 by the distance 2*d*. This results in that the line trace formed on the film 8 by the second light spot No. 2 is separated from the line trace of the light spot No. 1 by the distance 2*d* and these traces are parallel to each other.

FIG. 4B shows the condition at an instant $t=1/60$ second. At this instant the frame 24 of the film 8 moves downward by D/2 and is coincident with the scanning raster region 7 and the light spot No. 263A for the 263rd scanning line is at the middle of the upper end of the scanning raster region 7. Also by this time the scanning of 262½ lines has been finished and the television signal of the first field has been supplied from the output terminal 11 of the photoelectric converting device 10. At this instant the second light spot No. 263B for the 263rd line is at the center of the lower end of the raster region 7 and the light spot No. 264 for the 264th line is above an extension of the lower end of the raster region 7 and is apart from the left side of the scanning raster region 7 by H/2. As the drum 4 rotates by H'/2 from such position, the light spot No. 263B scans the film over H/2 . During this time period the film 8 moves downward over *d*/2, so that the scanning trace by means of the light spot No. 264 is interposed between the trace of the light spot No. 1 and that of the light spot No. 2 and scans the intermediate region between these two traces.

FIG. 4C shows the condition at an instant $t=1/30$ second. At this instant the upper end of the frame 24 of the film 8 which has been scanned and the lower end of the next following frame are at the center of the scanning raster region 7. This new frame can be scanned in the same manner as described above. In this manner the interlaced television signal can be obtained at the output terminal 11 of the photoelectric device 10. This television signal is applied to a conventional television receiver together with the vertical and horizontal flyback blanking signals and the audio signal derived from the photoelectric devices 18 and 27, respectively.

In the above-mentioned scanning apparatus, if it is desired to scan a stationary picture film by making the picture film 8 stationary at the position where the frame 24 of the film 8 is coincident with the scanning raster region 7 as shown in FIG. 4B, the lower half portion $F_1$ only of the frame 24 is scanned by the first field and the upper half portion $F_2$ only of the frame 24 is scanned by the second field so that these two fields are superposed one upon the other on the television picture, thus rendering it impossible to reproduce a correct stationary film picture into a television picture.

Figure 5:
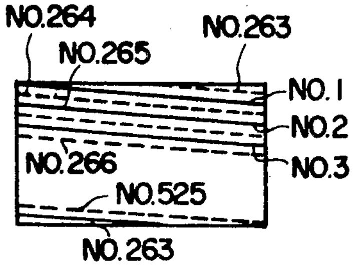
FIG. 5 shows a diagram illustrating the scanning operation for scanning a stationary film picture of the scanning and reproducing apparatus according to the invention.
Figure 6:
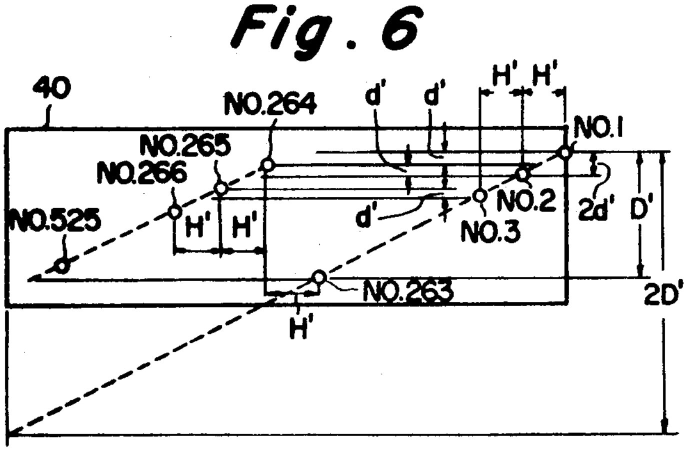
FIG. 6 is a developed view of a rotary drum for scanning the stationary film picture.

In order to scan the correct stationary picture film it is necessary to form a flying spot which is capable of effecting a conventional interlaced scanning for the stationary picture film as shown in FIG. 5. For this purpose, the invention makes use of a drum 40 provided with a number of scanning holes arranged as shown in FIG. 6. That is, the drum 40 is provided at its periphery with a number of small scanning holes equal in number to the number of scanning lines of one field and arranged along each of two spiral lines and spaced by a distance H' corresponding to the width H of the scanning raster region 7, each spiral line having a pitch which is equal to two times as great as the value D' obtained by dividing the height D of the scanning raster region 7 by the magnification *m* of the projecting lens 6. As can be seen from FIG. 6, the two spiral lines correspond to the first field and the second field, respectively, and each of the small scanning holes 3 Nos. 264–525 for the second field are separated in the vertical direction from each of those Nos. 1–263 for the first field by the diameter *d'* of the small scanning hole.

That is, each small scanning hole for the second field is positioned at the intermediate between two successive holes for the first field. For example, the small scanning hole No. 265 for the second field is positioned at the intermediate between the small scanning holes Nos. 2 and 3 for the first field. In other words, the small scanning hole No. 265 is lower than the small scanning hole No. 2 by *d'* and higher than the small scanning hole No. 3 by *d'*. If the above-mentioned drum 40 is rotated at a rotating speed equal to the frame frequency of the television signal in the same manner as in the case of scanning the moving film picture, the stationary film picture can be subjected to the conventional interlaced scanning to reproduce a television picture.

Figure 7:
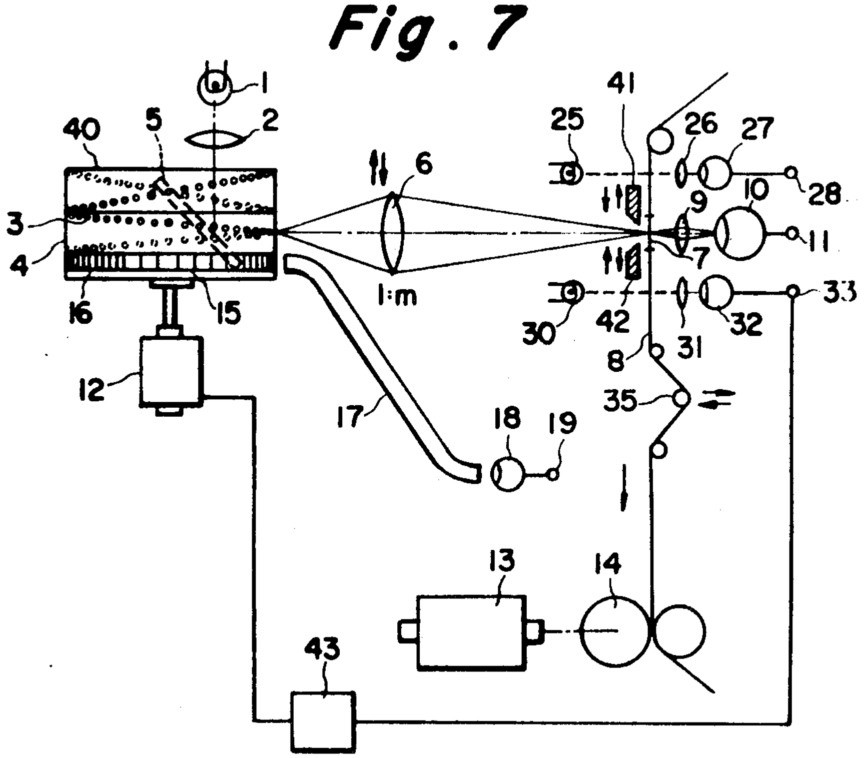
FIG. 7 shows diagrammatically a construction and arrangement of another embodiment of the scanning and reproducing apparatus according to the invention.

As described on the apparatus shown in FIG. 1, the track 23 for controlling the rotation of the drum 40 is scanned by the light source 30, the lens 31 and the photoelectric converting device 32 which supplies the control signal for the drum 4 at its output terminal 33. By means of thus obtained control signals it is possible to control the motor 12 and hence control synchronization of the rotation of the drum 4 with the travelling of the film 8. But, in case of scanning the stationary film picture the film 8 is made stopped so that the above mentioned synchronous control signal could not be obtained. in order to obviate such disadvantage use is made of an oscillator 43 as shown in FIG. 7 and adapted to generate a frequency which is slightly lower than that of the synchronous control signal in the same manner as in the conventional television receiver. The oscillator 43 is caused to effect a forced oscillation with the frequency of the synchronous control signal in case of scanning the ordinary moving film picture and is caused to effect an oscillation with its own frequency in case of scanning the stationary film picture in the absence of the synchronous control signal. Thus, it is possible to control the synchronous motor 12 so as to obtain the synchronization of the rotation of the drum 40 with the travelling of the film 8.

In accordance with the invention in order to selectively scan either one of the moving and stationary film pictures with the aid of the same scanning apparatus, the drum 40 for scanning the stationary film picture shown in FIG. 6 is disposed on the drum 4 for scanning the moving film picture shown in FIG. 2 and the assembly is secured to the same shaft as shown in FIG. 7 such that the optical system can select either one of the above two drums 4 and 40. The rotating speed of the drums 4 and 40 are made equal to the raster frequency so that it is not necessary to change the rotating speed of the motor 12 in case of selectively scan either one of the moving and stationary film pictures. In order to effect the above-mentioned selective scanning, it is sufficient to change over the optical system.

In the embodiment shown in FIG. 7 provision is made of diaphragms 41 and 42 arranged in front of the projecting lens 6. The projecting lens 6 and the diaphragms 41, 42 are adapted to be operatively associated with each other so as to move up and down in directions as shown by arrows thus rendering it possible to selectively scan either one of the moving and stationary film pictures. The synchronous control signal produced at the output terminal 33 of the photoelectric converting device 32 is supplied to the above-mentioned oscillator 43 whose output signal serves to effect the synchronization of the rotation of either one of the drums 4 and 40 with the travelling of the film 8.

If it is desired to scan the stationary film picture it is necessary to insert the frame 24 of the film 8 to be scanned into the scanning raster region 7. Such insertion can be effected by means of the pulley 35 for adjusting the position of the film 8 in a simple manner.

In the present embodiment, the aperture of the lens 9 is made large so that it is possible to make incident the flying spots produced from the moving film picture scanning drum 4 and the stationary film picture scanning drum 40 and passed through the film upon one photoelectric converting device 10.

The scanning apparatus according to the invention may scan not only the film 8 having one frame 24 recorded one film picture thereon as shown in FIG. 3, but also a film 8 having two frames 24 each recorded one film picture A, A' thereon. One frame A of these two frames A and A' corresponds to a first field and another frame A' corresponds to a second field of a television frame. In order to scan such first fields A, B, C and second fields A', B', C' as separated on the film 8, it is not necessary to use the scanning raster region 7 having the area of DxH as shown in FIG. 4A, but use may be made of a rectilinear flying spot adapted to effect a scanning along the same straight line in one direction only in a repeated manner so as to reproduce a television picture.

Figure 9:
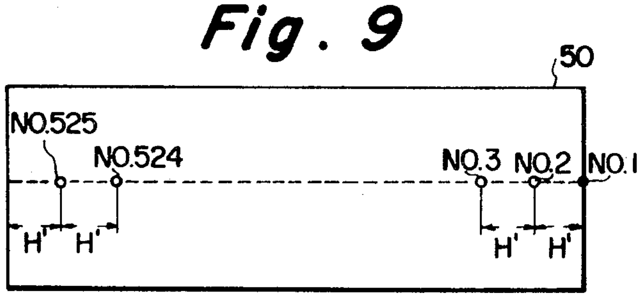
FIG. 9 is a developed view of a rotary drum for scanning the picture film shown in FIG. 8.

FIG. 9 shows a drum 50 adapted to generate the above-mentioned flying spot. The drum 50 is provided at its periphery with small scanning holes arranged along a plane perpendicular to the rotating axis of the drum 50 and spaced one from the other by H', the number of the small scanning holes corresponding to the number of scanning lines. It is a matter of course that the diameter of each of these small scanning holes is *d'* as mentioned above. The rotating speed of the drum 50 is determined so as to scan one frame by one rotation of the drum 50 so that the rotating speed of the drum 50 is made equal to the frame frequency of the television signal as above mentioned.

Figure 8:
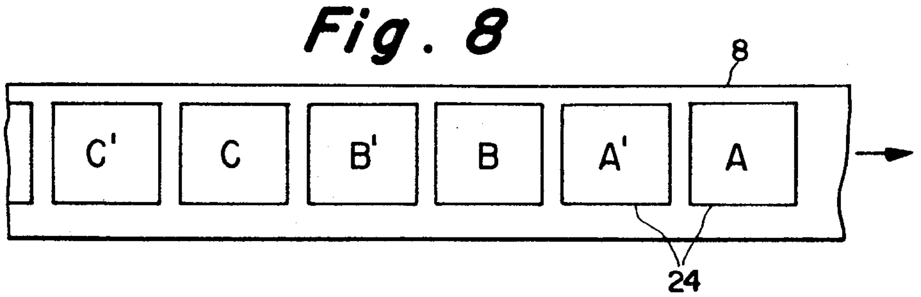
FIG. 8 is a plan view of a modified form of a film picture adapted to be scanned by the scanning and reproducing apparatus according to the invention.
Figure 10:
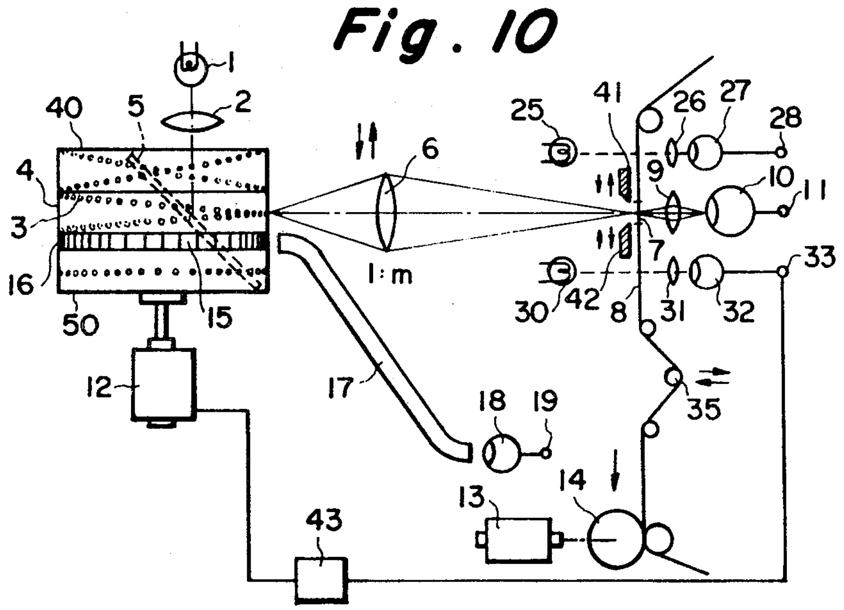
FIG. 10 shows diagrammatically a construction and arrangement of a further embodiment of the scanning and reproducing apparatus according to the invention.

FIG. 10 shows another embodiment of the scanning and reproducing apparatus according to the invention wherein the above-mentioned three scanning drums 40, 4 and 50 are disposed one upon the other and the assembly is secured to the same shaft and the projecting lens 6 and the diaphragms 41, 42 are adapted to be operatively associated with each other so as to move up and down in the directions shown by arrows. The apparatus thus constructed makes it possible to selectively scan the moving and stationary film pictures each recorded on one frame 24 of the film 8 as shown in FIG. 3 on the one hand the moving film picture recorded on the two frames A and A' of the film 8 as shown in FIG. 8 on the other hand. If the size of the frame changes, the projecting lens 6 should be replaced by another lens so as to obtain a suitable scanning raster region 7. In order to scan the film 8 having two frames for one image, that is, having two separated fields A and A' as shown in FIG. 8, the height D of the scanning raster region 7 is remained as it is, but the width H of the scanning raster region 7 must be brought into agreement with the length of the frame 24 in its horizontal direction.

In the film having two fields separated one from the other as shown in FIG. 8, the aspect ratio of each frame is not 3:4 which is adopted for the television picture, but may sometimes be 3:8 in which the size in the vertical direction is reduced by one half that of the aspect ratio of the television picture. In case of scanning the stationary film picture with the aid of the film whose aspect ratio is reduced in the vertical direction, provision is made of a further drum whose aspect ratio is reduced in the vertical direction by one half that of the drum 40 shown in FIG. 6 and of a further selective optical system corresponding thereto, thereby reproducing the stationary film picture.

In the above embodiment the scanning small holes 3 are provided on the periphery of each of the drums 4, 40 and 50. However, in practice, it is very difficult to form mechanically a number of small holes having the same shape and the same dimension so that the apparatus becomes more expensive.

Figure 11:
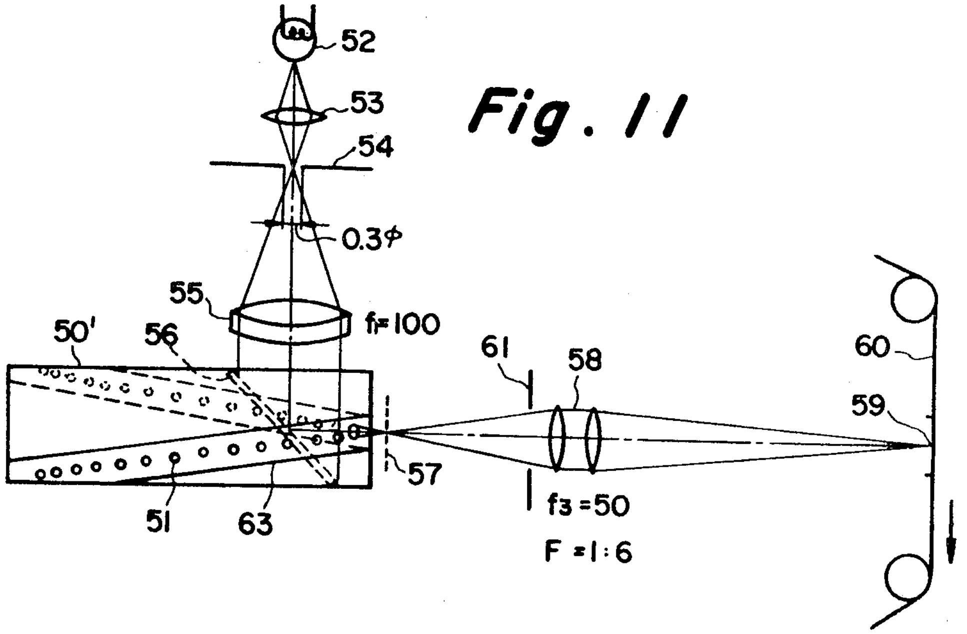
FIG. 11 shows diagrammatically a construction and arrangement of another embodiment of the scanning apparatus according to the invention.

FIG. 11 shows an embodiment of a scanning apparatus according to another aspect of the invention. The scanning apparatus of this embodiment comprises a light source 52 from which a light ray passes through a condenser lens 53 to a small circular diaphragm 54. The light ray passed through the circular diaphragm 54 is made to be a parallel light by means of a collimator lens 55 and is changed its direction by 90° from the vertical by means of a reflecting mirror 56 arranged in a space inside a rotary drum 50 and irradiated upon the periphery of the latter.

The above-mentioned optical system 52–55 may be arranged in the space within the rotary drum 50. In such a case the reflecting mirror 56 may be omitted.

The rotary drum 50 is provided at its periphery with convex lenses 51 as shown in FIG. 11. That is, the convex lenses 51 are arranged along a spiral line having a pitch corresponding to the height D of the scanning raster region 7 (FIG. 4A) and spaced one from the other by a distance corresponding to the width H of the scanning raster region 7. The number of these convex lenses 51 is associated with that of the scanning lines. As will be described hereinafter the above-mentioned convex lenses 51 may be formed on a replica made of a strip 63. Such a convex lens strip replica 63 with an opaque film 62 to be described later are stuck on the periphery of the drum 50 along the above-mentioned spiral line. The light ray passed through the convex lenses 51 forms an image of the circular diaphragm 54 at a plane 57. This image is projected by means of a projecting lens 58 onto a scanning raster region 59 of a film 60.

In the present embodiment, provision is further made of a second circular diaphragm 61 in front of the projecting lens 58.

If the focal distance $f_1$ of the collimator lens 55 100 and the focal distance $f_2$ of the convex lens 51 is 1, the diameter of the image of the circular diaphragm 54 having a diameter of 0.3 mm. and formed at the plane 57 is equal to $0.3\times1/100$ mm.$=3\mu$. This image is projected onto the scanning raster region 59 by means of the projecting lens 58 having a focal distance $f_3=50$ mm. and an aperture ratio $F=1:6$.

In the present embodiment, provision is made of a second circular diaphragm 61 so that the shape of the scanning spot projected onto the scanning raster region 59 is determined by the first diaphragm 54, while the amount of light ray is determined by the second circular diaphragm 61. This is common to all of the images formed at the plane 57 and hence the amount of light ray of all of images formed at the plane 57 becomes accurately constant. In case of forming small holes directly on the surface of the drum 4 without using small convex lenses 51 as shown in FIGS. 1, 6 and 7, it is difficult to make the dimension of the small holes accurately constant and each scanning line is scanned by different amount of light ray thus producing flickering in an image displayed on the screen of the television receiver.

Figure 12:
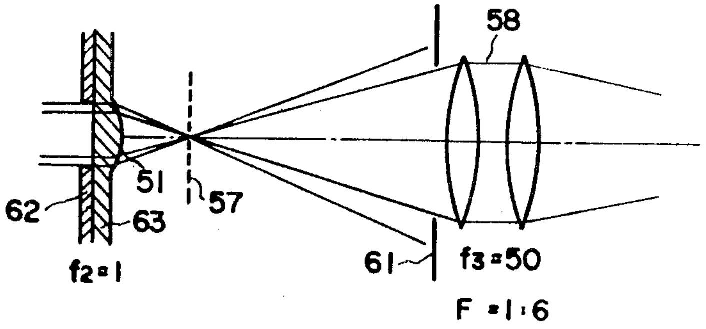
FIG. 12 shows a detail of a part of the scanning and reproducing apparatus shown in FIG. 11.
Figure 13A:
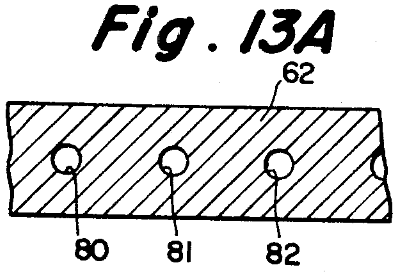
FIGS. 13A and 13B, 14A, 14B, 14C and 14D, and 15 are diagrammatic views illustrating steps of manufacturing a convex lens strip replica for use in the scanning and reproducing apparatus according to the invention.
Figure 13B:
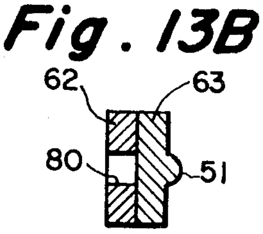

Thus, it is necessary to accurately manufacture the second circular diaphragm 61. Since the circular diaphragm 61 is large in dimension, it can be accurately worked in a relatively simple manner. On the contrary, it is not necessary to accurately work the first circular diaphragm 54. The strip 63 having convex lenses 51 formed thereon is provided at its opposite side with the opaque film 62 as shown in FIG. 12. This opaque film 62 is transparent at portions 80, 81, 82 corresponding to the effective diameters of the convex lenses 51 as shown in FIGS. 12, 13*A* AND 13*B*. As the opaque film 62 use may be made of a photographic film having a series of circular holes 80, 81, 82 ... each having a diameter corresponding to the effective diameter of the convex lens 51. The opaque film 62 serves to prevent undesired light ray from penetrating through the other portions than the convex lenses 51 and may also be formed by coating an opaque paint, thin metal foil or opaque film in a simple manner. The opaque film 62 serves to limit the diameter of the light beam arriving at the convex lenses 51 such that the diameter of the light spot becomes not excessive. The spherical aberration of the convex lenses 51 can be corrected by means of the projection lens 58 in a conventional manner. The chromatic aberration of the convex lenses 51 is extremely small so that such chromatic aberration is out of the question in practice.

The above-mentioned scanning apparatus according to the invention is relatively simple in construction and can produce a scanning spot having an extremely high accuracy and the intensity of light beam passing through the convex lenses is far stronger than that of the light beam passing through mechanically drilled holes, thus it is possible to effect a satisfactory scanning.

The method of manufacturing the convex lens strip replica 63 for use in the scanning apparatus according to the invention will now be explained with reference to FIGS. 14 and 15.

Use is made of a jig 71 provided at its center portion with a rectilinear groove 72 in which are arranged a number of steel balls 73 each having a high spherical accuracy and spaced by a distance equal to the space between the convex lenses 51 to be formed one from the other. For example, if the diameter of the steel ball 73 is 2 mm., the width of the groove 72 is made 2 mm. and the depth is made, for example, 1.5 mm. such that the head portion of the steel ball 73 projects out of the groove 62 by $h$=0.5 mm. The steel balls 73 are secured by cementing to the groove 72 to prevent movement of the steel balls 73. On the jig 71 is covered a mold 74 into which is poured a plastic, for example, acrylic acid resin which is then cured. This condition is shown in FIG. 14. Then, the mold 74 is removed to obtain a cured master mold 75. This master mold 75 is provided with a number of indentations which are aligned with one another. On this master mold 75 is poured again acrylic acid resin to form a convex lens strip replica 63 having a number of convex lenses 51 aligned with one another. The convex lens strip replica 63 thus obtained is adhered onto the periphery of the rotary drum 50 along one spiral line. Such method makes it possible to determine the spherical accuracy of the convex lens 51 with the aid of the spherical accuracy of the steel ball 73. As this steel ball 73, use may be made, for example, of accurately machined balls adapted for use in bearings and hence the accuracy of the steel ball 73 may be made extremely high.

Figure 14A:
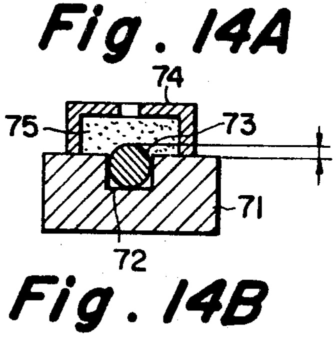
Figure 14B:
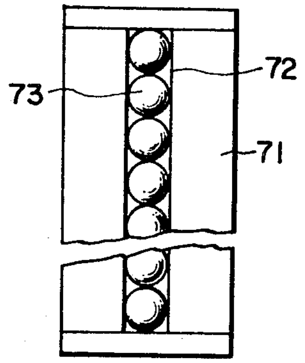
Figure 14C:
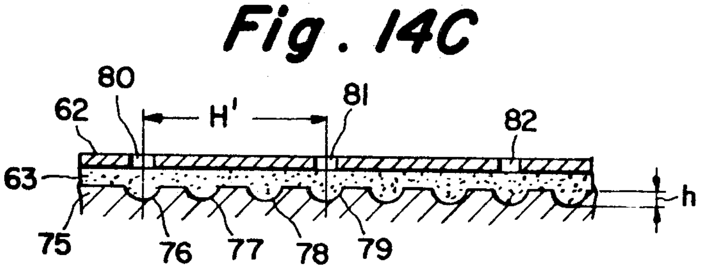

Alternatively, the steel balls 73 may be arranged closely side by side in the rectilinear groove 72 as shown in FIG. 14*b*. In this case the width of the groove 72 is also made equal to the diameter of the steel ball 73 and the depth of the groove 22 is made slightly greater than the diameter of the steel ball 23 by a length $h$. On the jig 71 is covered a mold 74 into which is poured a plastic, for example, acrylic acid resin which is then cured. This condition is shown in FIG. 14*a*. Then, the mold 74 is removed to obtain a cured master mold 75 as shown in FIG. 14*c*. This master mold 75 is provided with a number of indentations 76, 77, 78, 79 ... which are aligned with one another. If the accuracy of the balls 73 is made 0.2–0.3$\mu$,the accuracy of the indentations 76, 77, 78, 79 ... of the master mold 75 becomes substantially the same as that of the balls 73. It is important to note that the successive indentations 76, 77, 78, 79 ... of the master mold 75 can easily be spaced one from the other with a high accuracy which is equal to the accuracy of the balls 73.

Figure 14D:
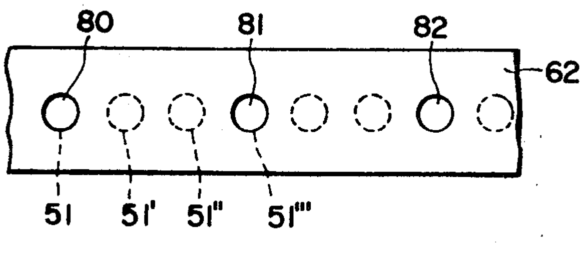

On this master mold 75 is poured again acrylic acid resin to form a convex lens strip replica 63 having a number of convex lenses 51, 51', 52'', 53''' as shown in FIG. 14*d* aligned with one another. That spacing H between such convex lenses as required to form the desired spot must correspond to such length that the spot formed by the convex lens 51 can correctly scan the transverse width H of the scanning raster region 7. That is, in FIG. 14*d* the convex lenses 51 and 51''' are necessary, but the convex lenses 51' and 52'' are not necessary. In order to bring the spacing H between the necessary convex lenses 51 and 51''' into correspondence with the transverse width H of the scanning raster region 7, the diameter of the ball 73 must be made smaller than the spacing H by a factor of integers. Thus, the radius of curvature of the convex lens 51 becomes one half the diameter of the ball 73 and hence becomes smaller than the spacing H by a factor of even number. The unnecessary convex lenses 51' and 51'' must not be penetrated by the light ray. Thus, it is necessary to adhere the opaque film 62 having transparent portions at positions corresponding to the necessary convex lenses 51 and 51''' and the other opaque portions onto that side of the convex lens strip replica 63 which is opposite to the side on which are formed the convex lenses 51, 51', 51'', 51''' ...

As can be seen from the above, if it is necessary to determine H=2 mm., the balls 73 each having a diameter of 1 mm. and whose number is two times larger than the scanning lines are arranged closely side by side in the groove 72. In this case the radius of curvature of the convex lens 51 becomes 0.5 mm. Since the refractive index of the acrylic acid resin for use in the convex lens strip replica 63 is about 1.5, the focal length of the convex lens 51 becomes about 1 mm. In this case one of the two adjacent convex lenses is not necessary so that such unnecessary convex lens is covered by the opaque film 62.

The convex lens strip replica 63 thus obtained is adhered onto the periphery of the rotary drum 5 along, for example, one spiral line as shown in FIG. 11.

Figure 15:
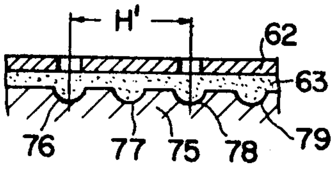

In case of pouring the acrylic acid resin into the master mold 75, the opaque film 62 having transparent portions at positions corresponding to the necessary convex lens positions is disposed above the master mold 75 such that the transparent portions are in alignment with the convex lens positions as shown in FIG. 15. After the acrylic acid resin has been cured both the convex lens strip replica 63 and the opaque film 62 adhered thereto may be removed from the master mold 75. In this case, the step of adhering the opaque film 62 to the convex lens strip replica 63 may be omitted.

It is to be understood that the convex lenses secured to the periphery of the rotary drum are not always required to be the convex lens strip replica, but may be small lenses separated one from the other.

It should be noted that the invention is not limited to the above-described embodiments and many modifications are possible within the scope of the invention. For example, use may be made of a light source the intensity of which is changed by the video signal and use may be made of a raw photosensitive film, then it is possible to record optically the video signal on the film.

It is a matter of course that the original video signal can be reproduced by optically scanning the thus obtained film. Moreover, it is also possible to use a color film and the light passing through it may be divided by a suitable color-dividing optical system into desired color components to produce desired color signals which can be reproduced by a conventional color television receiver.

I claim:

1. In an electromechanical interlaced scanning device for scanning the pictures of a moving picture film to produce a television signal, in which parallel light is converted into a light beam by means of a rotary drum, the shell of which is provided with a number of small light holes disposed along at least one spiral line about the rotary axis, and by means of a picture-reproducing optical system arranged thereafter, which light beam travels in lines across a picture area containing the moving picture film and is incident on a photoelectrical transducer, the improvement wherein, adjacent the drum, there is provided at least one additional drum, rotating together with the first drum about the same axis of rotation, the light holes of said additional drum being disposed along spiral lines of different number and pitch, as compared to those of the first drum, and wherein the reproducing optical system is positionable between at least first and second positions to selectively coordinate the reproducing optical system with said drum and said additional drum whereby scanning of motion picture film or stationary film is possible.

2. A picture-scanning device as claimed claim 1, wherein the light holes of said first drum are disposed along a spiral line whose pitch corresponds to the height of the picture area and separated one from the other by a distance in the direction of the drum circumference corresponding to the width of the picture area, in which the light holes of the further drum are disposed at equal distance H' with respect to each other which is the same as in the first drum along two spiral lines, offset by 180° over the drum circumference, the pitch 2D' of which are, in each case, twice as high as the pitch of the spiral line of the first drum.

3. A picture-scanning device as claimed in claim 1 further comprising a third drum (50) which includes light holes disposed along a spiral line, having a pitch of zero and separated one from the other by the same distance H' as in the other two drums.

4. A picture-scanning device as claimed in claim 1, in which all said drums have the same number of light holes.

5. A picture-scanning device as claimed in claim 1, in which the reproducing optical system comprising a lens and a diaphragm movable in the direction of the rotary axis of the drums.

6. A picture-scanning device, as claimed in claim 1, comprising a collimator lens for generating parallel light, in which the light holes are convex lenses formed on a strip mounted on the shell of each drum, and have a radius of curvature which is smaller than their distance to each other, and in which a circular diaphragm is disposed in front of the collimator lens.

7. A picture-scanning device as claimed in claim 6, in which the strip is provided at its back with an opaque film having transparent portions behind convex lenses of a diameter corresponding to the effective diameter of the lenses.

* * * * *